US008515313B2

(12) United States Patent　　(10) Patent No.: US 8,515,313 B2
Suto et al.　　(45) Date of Patent: Aug. 20, 2013

(54) ILLUMINATING DEVICE, IMAGE-READING APPARATUS COMPRISING THE ILLUMINATING DEVICE, AND IMAGE-FORMING APPARATUS COMPRISING THE IMAGE-READING APPARATUS

(75) Inventors: Yasuhiro Suto, Osaka (JP); Tomohiko Okada, Osaka (JP); Mitsuharu Yoshimoto, Osaka (JP); Shohichi Fukutome, Osaka (JP); Kenji Nakanishi, Osaka (JP); Hisashi Yamanaka, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 330 days.

(21) Appl. No.: 12/980,404

(22) Filed: Dec. 29, 2010

(65) Prior Publication Data

US 2011/0164899 A1　　Jul. 7, 2011

(30) Foreign Application Priority Data

Jan. 5, 2010　(JP) ................................ 2010-000811

(51) Int. Cl.
*G03G 15/04*　　(2006.01)
(52) U.S. Cl.
USPC ........................................ 399/221; 399/220
(58) Field of Classification Search
USPC ..... 399/177, 220, 221; 347/134; 362/311.06
See application file for complete search history.

(56) References Cited

U.S. PATENT DOCUMENTS

| | | | | | |
|---|---|---|---|---|---|
| 4,525,059 | A | * | 6/1985 | Haramaki | 399/221 X |
| 4,816,875 | A | * | 3/1989 | Takeda et al. | 399/221 X |
| 4,827,314 | A | * | 5/1989 | Fujiwara | 399/221 X |
| 4,888,616 | A | * | 12/1989 | Nanamura et al. | 347/134 X |
| 5,113,225 | A | * | 5/1992 | Deguchi | 399/221 X |
| 7,136,203 | B2 | * | 11/2006 | Yokota et al. | 358/484 |
| 7,548,352 | B2 | * | 6/2009 | Sakurai et al. | 399/220 X |
| 7,566,856 | B2 | | 7/2009 | Kubo et al. | |
| 2008/0315071 | A1 | | 12/2008 | Kubo et al. | |

FOREIGN PATENT DOCUMENTS

| | | |
|---|---|---|
| CN | 101335813 A | 12/2008 |
| JP | 2007-005860 | 1/2007 |
| JP | 2008-035036 | 2/2008 |

* cited by examiner

*Primary Examiner* — Sandra Brase
(74) *Attorney, Agent, or Firm* — Renner, Otto, Boisselle & Sklar, LLP

(57) ABSTRACT

An illuminating device includes a light-emitting element that is mounted on a base material and a light-guiding member that guides light from the light-emitting element to an irradiation target, and illuminates the irradiation target with the light transmitted through the light-guiding member. The light-guiding member includes an extending portion that extends from the surface of the base material on which the light-emitting element is mounted to a left side end portion of the base material so as to cover the left side end portion. An image-reading includes this illuminating device. Image-forming apparatus includes this image-reading apparatus.

20 Claims, 10 Drawing Sheets

ILLUMINATING DEVICE, IMAGE-READING APPARATUS COMPRISING THE ILLUMINATING DEVICE, AND IMAGE-FORMING APPARATUS COMPRISING THE IMAGE-READING APPARATUS

CROSS-REFERENCE TO RELATED APPLICATIONS

This application claims priority under 35 U.S.C. §119(a) on Patent Application No. 2010-000811 filed in Japan on Jan. 5, 2010, the entire contents of which are herein incorporated by reference.

BACKGROUND OF THE INVENTION

1. Field of the Invention

The present invention relates to an illuminating device for illuminating an irradiation target such as an original, an image-reading apparatus provided with the illuminating device, and image-forming apparatus provided with the image-reading apparatus.

2. Description of Related Art

This type of illuminating device is used mounted on, for example, an image-reading apparatus, is provided with a plurality of light-emitting elements (e.g., LEDs) that are arranged in a line parallel to a main-scanning direction for reading an original, and illuminates an original using these light-emitting elements. The image-reading apparatus repeatedly scans an original illuminated by the illuminating device in the main-scanning direction, and, at the same time, scans the original also in a sub-scanning direction, thereby reading the entire original. An image of this read original is output to a printer or the like, and recorded on a recording paper.

In such an illuminating device, all parts of light emitted from each light-emitting element are desirably caused to be incident on an original reading range. However, actually, all parts of light emitted from each light-emitting element cannot be caused to be incident on the original reading range, and a light loss occurs. There is a demand for reduction in this light loss.

Thus, in JP 2008-35036A, each light-emitting element and a light guide are mounted on a base material, the light guide is positioned on the light-emitting side of each light-emitting element, light from each light-emitting element is condensed by this light guide and emitted to the original reading range, and light that does not pass through the light guide is reflected by a reflecting plate and emitted onto the original reading range, thereby achieving a reduction in the light loss.

In JP 2008-35036A, light that does not pass through the light guide is reflected by the reflecting plate and emitted onto the original, but the light from the light-emitting elements is dispersed light. Thus, all parts of the light cannot be caused to be incident on the reflecting plate, and the light loss cannot be sufficiently reduced. In particular, the orientation of light emitted from the light-emitting elements in a direction substantially parallel to the base material surface is not controlled at all, and a reduction in the light loss of this light is not achieved.

SUMMARY OF THE INVENTION

The present invention was arrived at in view of the above-described conventional problem, and it is an object thereof to provide an illuminating device that can improve the illumination efficiency on an irradiation target such as an original by suppressing a light loss, an image-reading apparatus provided with this illuminating device, and image-forming apparatus provided with this image-reading apparatus.

In order to solve the above-described problem, an illuminating device according to the present invention includes a light-emitting element mounted on a base material, and a light-guiding member for guiding light from the light-emitting element to an irradiation target, and illuminates the irradiation target with the light transmitted through the light-guiding member, wherein the light-guiding member has an extending portion that extends from a surface of the base material on which the light-emitting element is mounted to a side end portion of the base material so as to cover the side end portion of the base material.

In such an illuminating device, the light-guiding member includes an extending portion that extends from a surface (top face) of the base material on which the light-emitting element is mounted to a side end portion (e.g., side surface) of the base material so as to cover the side end portion of the base material. Accordingly, light emitted from the light-emitting element in a direction substantially parallel to the base material surface is guided to the extending portion of the light-guiding member, and transmitted and guided through the extending portion. Accordingly, the orientation of light emitted from the light-emitting element in a direction substantially parallel to the base material surface can be controlled by the extending portion, and the light loss can be reduced.

For example, the illuminating device further includes a reflecting member that reflects light emitted from the light-emitting element and transmitted through the light-guiding member, thereby illuminating the irradiation target, the light-emitting element and the reflecting member are arranged so as to sandwich a path through which light reflected by the irradiation target passes, and the light-guiding member is disposed on a light-emitting element side, and light guided through the extending portion of the light-guiding member and emitted from the extending portion is reflected by the reflecting member and illuminates the irradiation target.

In this case, light guided by the extending portion of the light-guiding member is reflected by the reflecting member and illuminates the irradiation target.

Furthermore, the light-guiding member may further includes: a direct emitting portion that is disposed between the light-emitting element and the irradiation target, and that directly guides light emitted from the light-emitting element to the irradiation target; and an indirect emitting portion that is disposed between the light-emitting element and the reflecting member and between the base material and the irradiation target, and that guides light emitted from the light-emitting element to the reflecting member; and a light emission face of the indirect emitting portion facing the reflecting member may be a convex face.

With this configuration, light emitted from the light-emitting element is condensed by the convex face and guided to the reflecting member, and is reflected by the reflecting member and guided to the irradiation target. Accordingly, the light intensity at the surface of the irradiation target can be increased.

Furthermore, a direction of an optical axis of the light-emitting element may be a direction toward the reflecting member.

With this configuration, the ratio of light incident on the irradiation target via the reflecting member, in light emitted from the light-emitting element, can be increased. Light incident on the irradiation target via the reflecting member is dispersed more than light not transmitted via the reflecting member but directly incident on the irradiation target, and the non-uniformity in the illumination is low. Accordingly, the ratio of light incident on the irradiation target via the reflecting member is increased, and, thus, the non-uniformity in the illumination can be reduced.

Furthermore, a ratio between an amount of light incident on the irradiation target via the reflecting member from the light-guiding member and an amount of light incident on the irradiation target directly from the light-guiding member may be set to 4:6 to 5:5.

With this configuration, the balance between the amount of light transmitted from the light-guiding member via the reflecting member and incident on the irradiation target, which is light having a relatively low non-uniformity in the illumination, and the amount of light transmitted from the light-guiding member and directly incident on the irradiation target, which is light having a relatively high illumination level, can be optimized. Accordingly, both a good illumination level and a good non-uniformity in the illumination can be obtained.

The extending portion may be arranged so as to cover a whole side surface of the base material, and a portion of the reflecting member may extend from a plane obtained by extending the a surface of the base material on which the light-emitting element is mounted in a direction away from the irradiation target.

With this configuration, light emitted from the extending portion covering the whole side surface of the base material can be received and reflected by the portion of the reflecting member extending from the plane obtained by extending the surface of the base material on which the light-emitting element is mounted in a direction away from the irradiation target. Accordingly, the light loss can be further reduced.

Alternatively, the illuminating device further may include a cut face that is formed by cutting the extending portion of the light-guiding member, and that reflects light guided to the extending portion.

In this case, light guided by the extending portion of the light-guiding member can be reflected by the cut face of the extending portion and illuminate the irradiation target.

The cut face may be formed such that light guided to the extending portion is totally reflected by the cut face and emitted to the irradiation target.

With this configuration, light guided to the cut face of the extending portion can be guided to the irradiation target without any loss, and, thus, the light loss can be further reduced.

Furthermore, the light-guiding member may have a light incident face on which light from the light-emitting element is incident, the light incident face may include a rising portion that rises up from the surface of the base material on which the light-emitting element is mounted, and the rising portion of the light incident face may be inclined with respect to the surface of the base material on which the light-emitting element is mounted at an angle at which light emitted from the light-emitting element in a direction parallel to the surface of the base material on which the light-emitting element is mounted is incident on and refracted by the rising portion, and guided to the extending portion.

Since the height of the light-emitting element is low, light emitted from the light-emitting element is substantially parallel to the surface (base material surface) of the base material on which the light-emitting element is mounted. When light substantially parallel to the surface of the base material on which the light-emitting element is mounted is incident on the rising portion of the light incident face of the light-guiding member inclined at such an angle, the light is refracted in a direction closer to the surface of the base material on which the light-emitting element is mounted, and reliably guided to the extending portion of the light-guiding member covering the side end portion of the base material. Accordingly, with the configuration in which the rising portion of the light incident face of the light-guiding member is inclined at such an angle, the effect of the present invention can be reliably obtained.

Furthermore, the angle defined by the rising portion of the light incident face and the surface of the base material on which the light-emitting element is mounted may be an obtuse angle.

With this configuration, when light substantially parallel to the surface of the base material on which the light-emitting element is mounted is incident on the rising portion of the light incident face of the light-guiding member inclined at such an obtuse angle, the light is refracted in a direction closer to the surface of the base material on which the light-emitting element is mounted, and more reliably guided to the extending portion of the light-guiding member covering the side end portion of the base material. Accordingly, with the configuration in which the rising portion of the light incident face of the light-guiding member is inclined at an obtuse angle, the effect of the present invention can be more reliably obtained.

Furthermore, the light-guiding member is in close contact with the surface of the base material on which the light-emitting element is mounted and the side end portion of the base material.

In this case, no gap is formed between the light-guiding member and the surface of the base material on which the light-emitting element is mounted and the side end portion of the base material, and, thus, the amount of stray light is reduced, and the light loss can be suppressed. If a gap is formed between the light-guiding member and the surface of the base material on which the light-emitting element is mounted and the side end portion of the base material, stray light is generated at this gap, and the light loss increases.

Furthermore, the illuminating device may further include a frame that integrally supports the base material and the light-guiding member, and the light-guiding member may be fixed to the frame.

When the light-guiding member is fixed to the frame in this manner, the frame can reinforce the light-guiding member. In an illuminating device that illuminates an irradiation target, such as an original, having a relatively long width (in a direction parallel to the surface of the base material on which the light-emitting element is mounted and parallel to the side surface of the base material), the light-guiding member has to be longer than the width of the irradiation target (original width, etc.), and the light-guiding member is in the shape of a bar. This bar-shaped light-guiding member is easily warped, but becomes less warped when being reinforced by the frame. On the other hand, in conventional examples, the light-guiding member is fixed to the base material, and, thus, the bar-shaped member cannot be effectively prevented from being warped because the base material is not sufficiently strong.

The surface of the base material on which the light-emitting element is mounted may be a white face.

With this configuration, light reflected by the surface of the base material on which the light-emitting element is mounted is transmitted through the light-guiding member and incident on the irradiation target. Accordingly, the light loss can be suppressed lower.

Meanwhile, the present invention is directed to an image-reading apparatus including the illuminating device of the present invention. The image-reading apparatus of the present invention may further include an imaging device that captures an image of the irradiation target.

Moreover, the present invention is directed image-forming apparatus including the image-reading apparatus of the present invention. The image-forming apparatus of the present invention may further include an image forming portion that forms an image read by the image-reading apparatus on a recording medium.

These image-reading apparatus and image-forming apparatus of the present invention employ the above-described illuminating device of the present invention, and, thus, they exhibit the same operations and effects as the illuminating device.

DETAILED DESCRIPTION OF THE INVENTION

Hereinafter, embodiments of the present invention will be described in detail with reference to the attached drawings.

Figure 1:
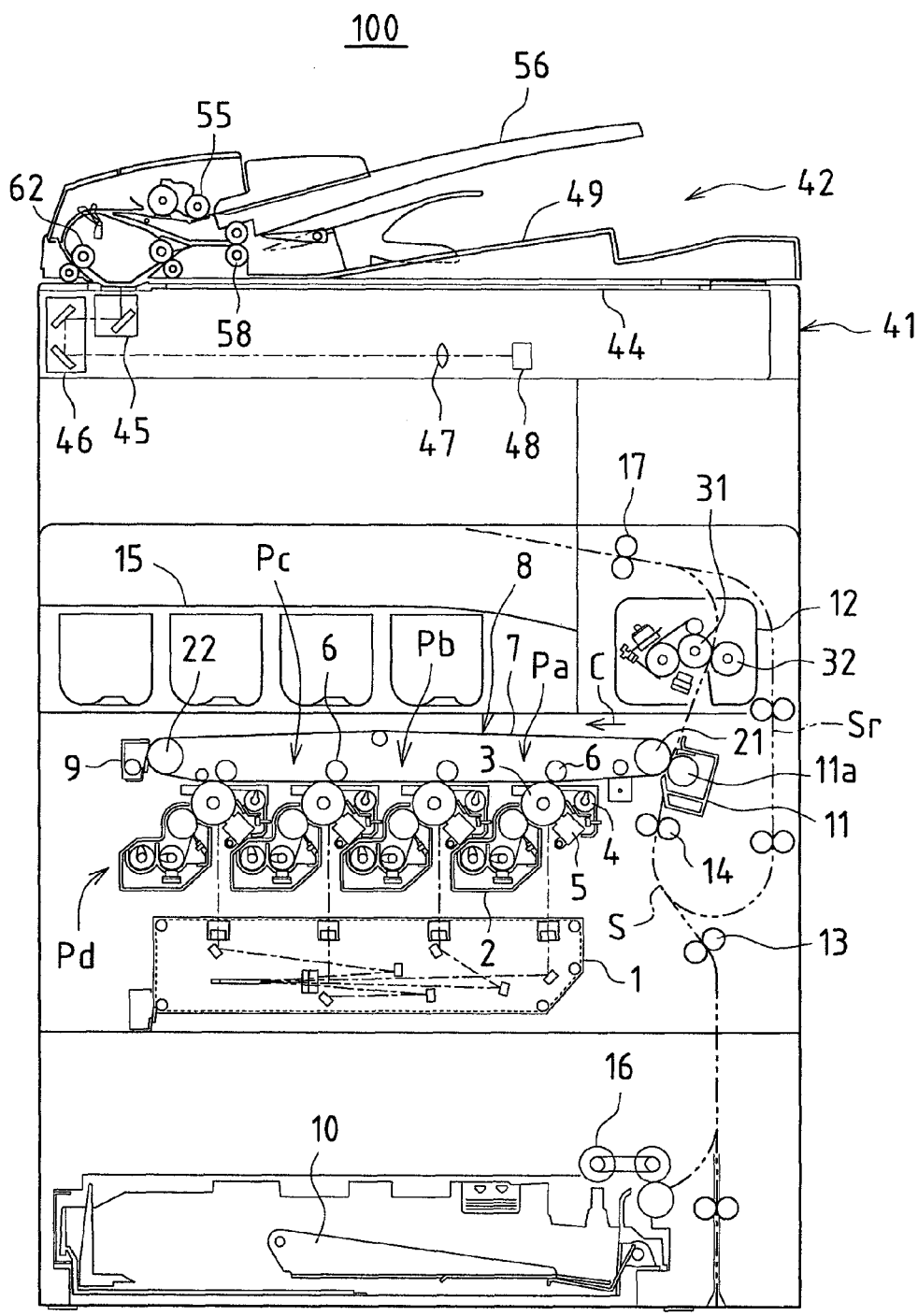
FIG. 1 is a cross-sectional view showing image-forming apparatus provided with an image-reading apparatus to which an illuminating device according to a first embodiment of the present invention has been applied.

FIG. 1 is a cross-sectional view showing image-forming apparatus provided with an image-reading apparatus to which an illuminating device according to a first embodiment of the present invention has been applied. Image-forming apparatus 100 is a so-called multifunction peripheral having a scanner function, a copy function, a printer function, a facsimile function, and the like. The image-forming apparatus 100 transmits an image of an original (irradiation target) read by an image-reading apparatus 41 to the outside (a personal computer connected via a local area network to the image-forming apparatus 100, a facsimile apparatus connected via a public telephone network to the image-forming apparatus 100, etc.) (this function corresponds to a scanner function and a facsimile function), and forms and records on a recording medium such as a recording paper, in color or monochrome, an image of the read original or an image received from the outside (this function corresponds to a copy function, a printer function, and a facsimile function).

The image-forming apparatus 100 is provided with an image forming portion configured from a laser exposure apparatus 1, development apparatuses 2, photosensitive drums 3, charging units 5, cleaner apparatuses 4, an intermediate transfer belt apparatus 8, a fixing apparatus 12, a paper transport path S, a paper feed tray 10, a paper discharge tray 15, and the like, in order to print an image on a recording medium such as a recording paper.

Image data processed in the image-forming apparatus 100 corresponds to a color image using colors consisting of black (K), cyan (C), magenta (M), and yellow (Y), or corresponds to a monochrome image using a monochrome color (e.g., black). Accordingly, four development apparatuses 2, four photosensitive drums 3, four charging units 5, and four cleaner apparatuses 4 are arranged so as to form four types of toner images corresponding to the respective colors. These four constituent elements respectively correspond to black, cyan, magenta, and yellow, and constitute four image stations Pa, Pb, Pc, and Pd.

The photosensitive drums 3 have photosensitive layers on their surfaces. The charging units 5 are charging means for uniformly charging the surfaces of the photosensitive drums 3 to a predetermined potential. As the charging units 5, a contact-type charging unit using a roller or brush, or a corona charger-type charging unit is used.

The laser exposure apparatus 1 is a laser scanning unit (LSU) provided with laser diodes and reflecting mirrors, and causes the charged surfaces of the photosensitive drums 3 to be exposed to light according to image data to form electrostatic latent images corresponding to the image data on the surfaces.

The development apparatuses 2 develop the electrostatic latent images formed on the surfaces of the respective photosensitive drums 3 using toners of the respective colors, and form toner images on the surfaces of the photosensitive drums 3. The cleaner apparatuses 4 remove and recover toners remaining on the surfaces of the respective photosensitive drums 3 after development and image transfer.

The intermediate transfer belt apparatus 8 is disposed above the photosensitive drums 3, and provided with an intermediate transfer belt 7, an intermediate transfer belt-driving roller 21, an idler roller 22, four intermediate transfer rollers 6, and an intermediate transfer belt-cleaning apparatus 9.

The intermediate transfer belt 7 is obtained by forming a film having a thickness of approximately 100 μm to 150 μm into an endless belt. The intermediate transfer belt-driving roller 21, the intermediate transfer rollers 6, the idler roller 22, and the like support the intermediate transfer belt 7 in a tensioned state, and circumferentially move the intermediate transfer belt 7 in the arrow C direction.

The intermediate transfer rollers 6 are supported in a rotatable manner near the intermediate transfer belt 7, and pressed via the intermediate transfer belt 7 against the respective photosensitive drums 3.

The toner images on the surfaces of the photosensitive drums 3 are sequentially transferred and superimposed on the intermediate transfer belt 7, and a color toner image (a toner image containing the above-described colors) is formed on the intermediate transfer belt 7. The toner images are transferred from the photosensitive drums 3 to the intermediate transfer belt 7, using the intermediate transfer rollers 6 pressed against the back faces of the intermediate transfer belt 7. The intermediate transfer rollers 6 are rollers including a base that is made of a metal (e.g., stainless steel) shaft having a diameter of 8 to 10 mm, and an electrically conductive elastic material (e.g., ethylene-propylene-diene monomer rubber (EPDM), polyurethane foam, etc.) that covers the surface of the shaft. In order to transfer the toner images, a high-voltage transfer bias (a high voltage having the opposite polarity (+) to the charge polarity (−) of the toner) is applied to the intermediate transfer rollers 6, and the electrically conductive elastic material enables a high voltage to be uniformly applied to a recording paper.

In this manner, the toner images on the surfaces of the photosensitive drums 3 are superimposed on the intermediate transfer belt 7, and form a color toner image represented by the image data. This color toner image is transported together with the intermediate transfer belt 7, and transferred to a recording paper at a nip region between the intermediate transfer belt 7 and a transfer roller 11a of a secondary transfer apparatus 11.

A voltage (a high voltage of the opposite polarity (+) to the charge polarity (−) of the toner) for transferring the toner images containing the above-described colors on the intermediate transfer belt 7 to the recording paper is applied to the transfer roller 11a of the secondary transfer apparatus 11. Furthermore, in order to constantly maintain the nip region between the intermediate transfer belt 7 and the transfer roller 11a of the secondary transfer apparatus 11, one of the transfer roller 11a of the secondary transfer apparatus 11 and the intermediate transfer belt-driving roller 21 is made of a hard material (metal, etc.), and the other is made of a soft material such as an elastic material (elastic rubber, resin foam, etc.).

The toner image on the intermediate transfer belt 7 may not be completely transferred by the secondary transfer apparatus 11 to the recording paper, and toner may remain on the intermediate transfer belt 7. This residual toner causes toner color mixing in the following step. Accordingly, residual toner on the intermediate transfer belt 7 is removed and recovered by the intermediate transfer belt-cleaning apparatus 9. The intermediate transfer belt-cleaning apparatus 9 includes, for example, a cleaning blade that is in contact with the intermediate transfer belt 7 and removes the residual toner on the intermediate transfer belt 7 as a cleaning member. The idler roller 22 supports the intermediate transfer belt 7 from the back face side at a point where the cleaning blade is in contact with the intermediate transfer belt 7.

After the color toner image is transferred to the recording paper at the nip region between the intermediate transfer belt 7 and the transfer roller 11a of the secondary transfer apparatus 11, the recording paper is transported to the fixing apparatus 12. The fixing apparatus 12 is provided with a heat roller 31, a pressure roller 32, and the like, and the recording paper is sandwiched between the heat roller 31 and the pressure roller 32 and transported.

The heat roller 31 is controlled so as to be at a predetermined fixing temperature based on detection output of a temperature detector (not shown). The heat roller 31 and the pressure roller 32 apply thermo-compression to the recording paper, and thus melt, mix, and press the color toner image transferred to the recording paper, and thermally fix the color toner image to the recording paper.

Meanwhile, the paper feed tray 10 is a tray in which recording papers are stored. The paper feed tray 10 is disposed in the lower portion of the image-forming apparatus 100, and feeds the recording papers in the paper feed tray 10.

The image-forming apparatus 100 includes an S-shaped paper transport path S for transporting the recording paper supplied from the paper feed tray 10 via the secondary transfer apparatus 11 and the fixing apparatus 12 onto the paper discharge tray 15. Along the paper transport path S, a paper pickup roller 16, paper registration rollers 14, the fixing apparatus 12, transport rollers 13, paper discharge rollers 17, and the like are arranged.

The paper pickup roller 16 is a draw-in roller that is disposed in a side end portion of the paper feed tray 10 and that feeds recording papers sheet by sheet from the paper feed tray 10 into the paper transport path S. The transport rollers 13 are a plurality of pairs of small rollers for promoting and assisting transportation of a recording paper.

The paper registration rollers 14 temporarily stop a recording paper that has been transported, adjust the position of the leading edge of the recording paper, and transport the recording paper with good timing matched with the rotation of the photosensitive drums 3 and the intermediate transfer belt 7 into the nip region between the intermediate transfer belt 7 and the transfer roller 11a of the secondary transfer apparatus 11 such that the color toner image on the intermediate transfer belt 7 is transferred to the recording paper at the nip region.

For example, based on detection output of a pre-registration detection switch (not shown), the paper registration rollers 14 transport the recording paper into the nip region between the intermediate transfer belt 7 and the transfer roller 11a of the secondary transfer apparatus 11 such that the leading edge of the color toner image on the intermediate transfer belt 7 matches the leading edge of the image formation region of the recording paper in the nip region.

Furthermore, after the color toner image is fixed to the recording paper at the fixing apparatus 12, the recording paper passes through the fixing apparatus 12, and is discharged facedown by the paper discharge rollers 17 onto the paper discharge tray 15.

Furthermore, when performing printing not only on the front face of the recording paper but also on the back face of the recording paper, the paper discharge rollers 17 on the paper transport path S are stopped and then rotated in reverse during transportation of the recording paper by the paper discharge rollers 17, the recording paper is passed through a reversing path Sr where the front and the back of the recording paper are reversed, and then the recording paper is guided to the paper registration rollers 14. Subsequently, as in the case of the front face of the recording paper, an image is recorded and fixed to the back face of the recording paper, and the recording paper is discharged onto the paper discharge tray 15.

Figure 2:
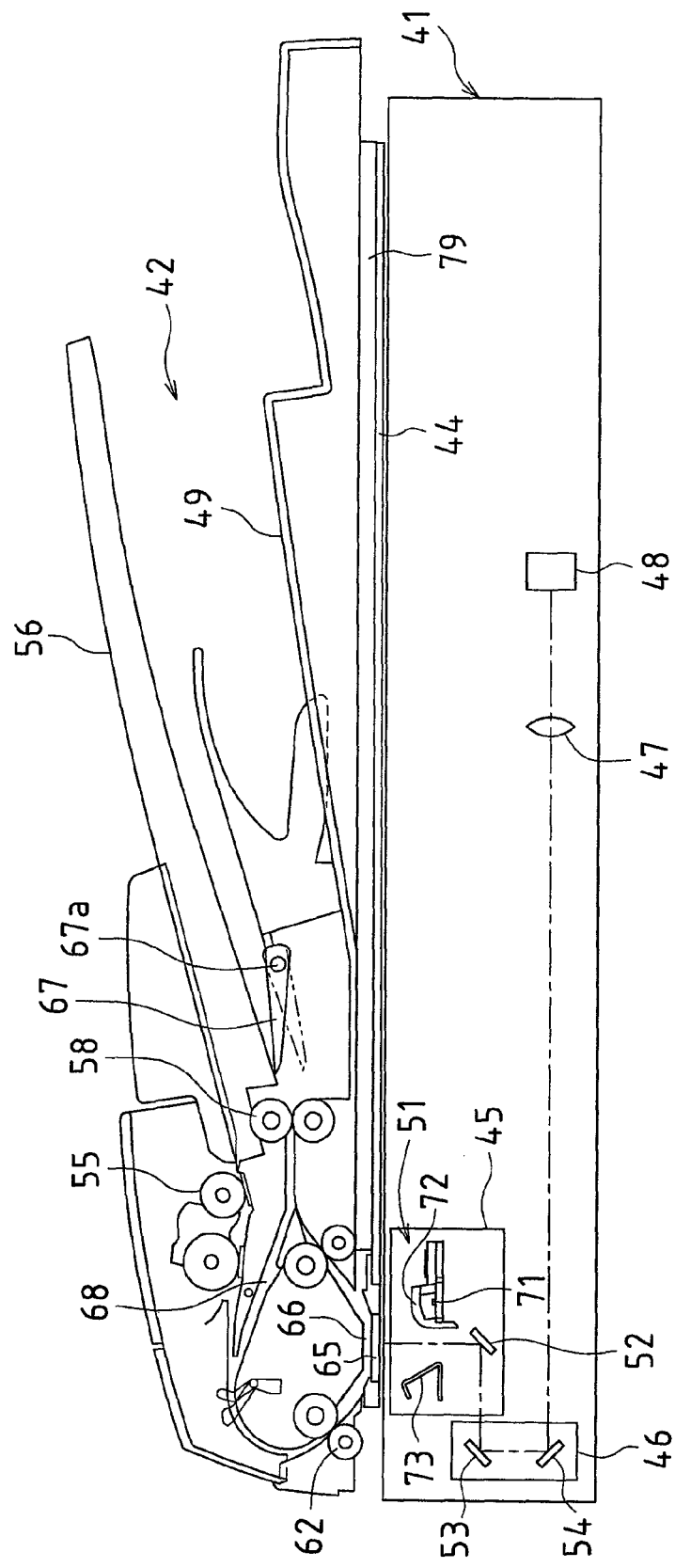
FIG. 2 is an enlarged cross-sectional view showing the image-reading apparatus and an original-transporting apparatus of FIG. 1.

Next, the image-reading apparatus 41 and an original-transporting apparatus 42 will be described in detail. FIG. 2 is an enlarged cross-sectional view showing the image-reading apparatus 41 and the original-transporting apparatus 42.

An inner side of the original-transporting apparatus 42 is pivotally supported by a hinge (not shown) on an inner side the image-reading apparatus 41, and the original-transporting apparatus 42 is opened or closed by lifting or lowering an outer side portion thereof. When the original-transporting apparatus 42 is opened, a platen glass 44 of the image-reading apparatus 41 is exposed, and an original is placed on the platen glass 44.

The image-reading apparatus 41 is provided with the platen glass 44, a first scanning unit 45, a second scanning unit 46, an imaging lens 47, a charge coupled device (CCD) 48 as an imaging device, and the like.

The first scanning unit 45 is provided with an illuminating device 51 and a first reflecting mirror 52. While the first scanning unit 45 is moving at a constant speed V by a distance according to the original size in a sub-scanning direction Y, the original on the platen glass 44 is exposed to the illuminating device 51 and the reflected light from the original is reflected by the first reflecting mirror 52 and guided to the second scanning unit 46, and, thus, the image of the original surface is scanned in the sub-scanning direction Y. The second scanning unit 46 is provided with a second reflecting mirror 53 and a third reflecting mirror 54. While the second scanning unit 46 is moving following the first scanning unit 45 at a speed V/2, the reflected light from the original is reflected by the second reflecting mirror 53 and the third reflecting mirror 54 and guided to the imaging lens 47. The imaging lens 47 condenses the reflected light from the original onto the CCD 48, and forms the image of the original surface on the CCD 48. The CCD 48 captures the image of the original surface. The CCD 48 repeatedly scans the image of the original in the main-scanning direction, and outputs analog image signals for one main scanning line after each scan. Here, instead of the CCD 48, other imaging devices such as a complementary metal oxide semiconductor image sensor (CMOS) may be used.

The first scanning unit 45 and the second scanning unit 46 respectively include pulleys (not shown). A wire (not shown) is wound onto these pulleys, the wire is driven by a stepping motor, and, thus, the first scanning unit 45 and the second scanning unit 46 are moved in synchronization.

Furthermore, the image-reading apparatus 41 can read not only an original that is being stopped but also an image of the surface of an original that is being transported by the original-transporting apparatus 42. In this case, as shown in FIG. 2, the first scanning unit 45 is moved to a reading range below an original-reading glass 65, the second scanning unit 46 is positioned according to the position of the first scanning unit 45. Then, in this state, the original-transporting apparatus 42 starts to transport the original.

In the original-transporting apparatus 42, a pickup roller 55 is pressed against an original on an original tray 56 and rotated, the original is drawn in and transported, the leading edge of the original is caused to abut against registration rollers 62 and its position is adjusted, and, then, the original is passed through a region between the original-reading glass 65 and a reading guide plate 66 and discharged from paper discharge rollers 58 onto a paper discharge tray 49.

While the original is being transported, the illuminating device 51 of the first scanning unit 45 illuminates the original surface via the original-reading glass 65, the reflected light from the original surface is guided by the reflecting mirrors 52 to 54 of the first scanning unit 45 and the second scanning unit 46 to the imaging lens 47, and condensed by the imaging lens 47 onto the CCD 48, the image of the original surface is formed on the CCD 48, and, thus, the image of the original surface is read.

Furthermore, when reading the back face of the original, an intermediate tray 67 has been rotated about a shaft 67a as indicated by the dotted line, the paper discharge rollers 58 are stopped during discharge of the original from the paper discharge rollers 58 onto the paper discharge tray 49, and, thus, the original is received by the intermediate tray 67. Then, the paper discharge rollers 58 are rotated in reverse, the original is guided via a reverse transport path 68 to the registration rollers 62, and, thus, the front and the back of the original are reversed. Then, as in the case of the image on the front face of the original, the image on the back face of the original is read, the intermediate tray 67 is returned to its initial position indicated by the solid line, and the original is discharged from the paper discharge rollers 58 onto the paper discharge tray 49.

In this manner, the image of the original surface thus read by the CCD 48 is output from the CCD 48 as analog image signals, and these analog image signals are A/D converted into digital image signals. These digital image signals are subjected to various types of image processing and then transmitted to the laser exposure apparatus 1 of the image-forming apparatus 100, the image is recorded on a recording paper in the image-forming apparatus 100, and this recording paper is output as a photocopied original.

The original on the platen glass 44 or the original-reading glass 65 is illuminated by the illuminating device 51 of the first scanning unit 45. Here, it is desirable to reduce the light loss by causing almost all parts of light emitted from an LED array 71 of the illuminating device 51 to be incident on the original.

Thus, the illuminating device 51 of this embodiment includes a light-guiding member 72 that directly guides the light emitted from the LED array 71 toward the original and toward a reflecting plate 73, and the reflecting plate 73 that reflects the light guided by the light-guiding member 72 toward the original. Accordingly, almost all parts of light emitted from the LED array 71 are caused to be incident on the original, and the light loss is reduced.

Furthermore, as described later in detail, the light-guiding member 72 is configured from a direct emitting portion 77, an indirect emitting portion 78, and an extending portion 79, each of which guides light emitted from the LED array 71, and, thus, the light loss is also reduced.

Figure 3:
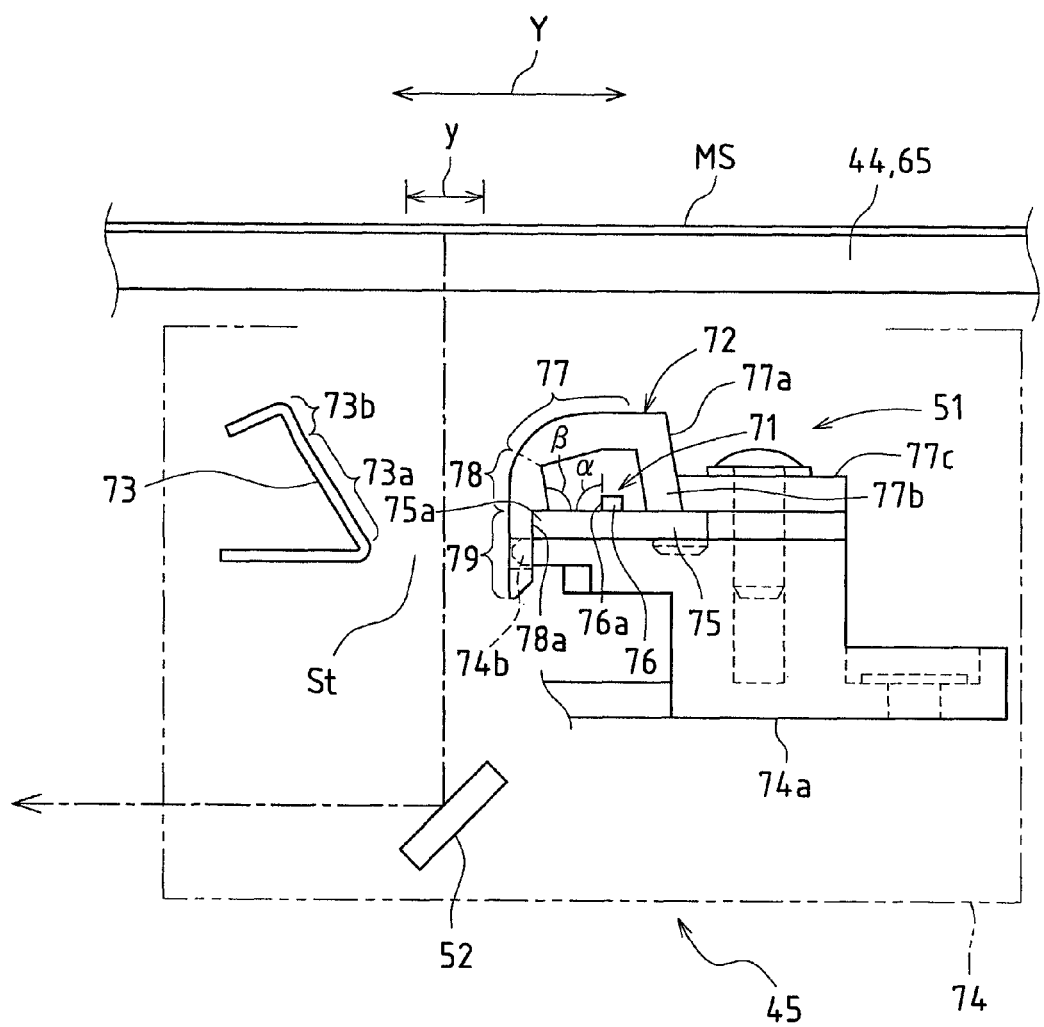
FIG. 3 is a cross-sectional view schematically showing a first scanning unit in the image-reading apparatus.
Figure 4:
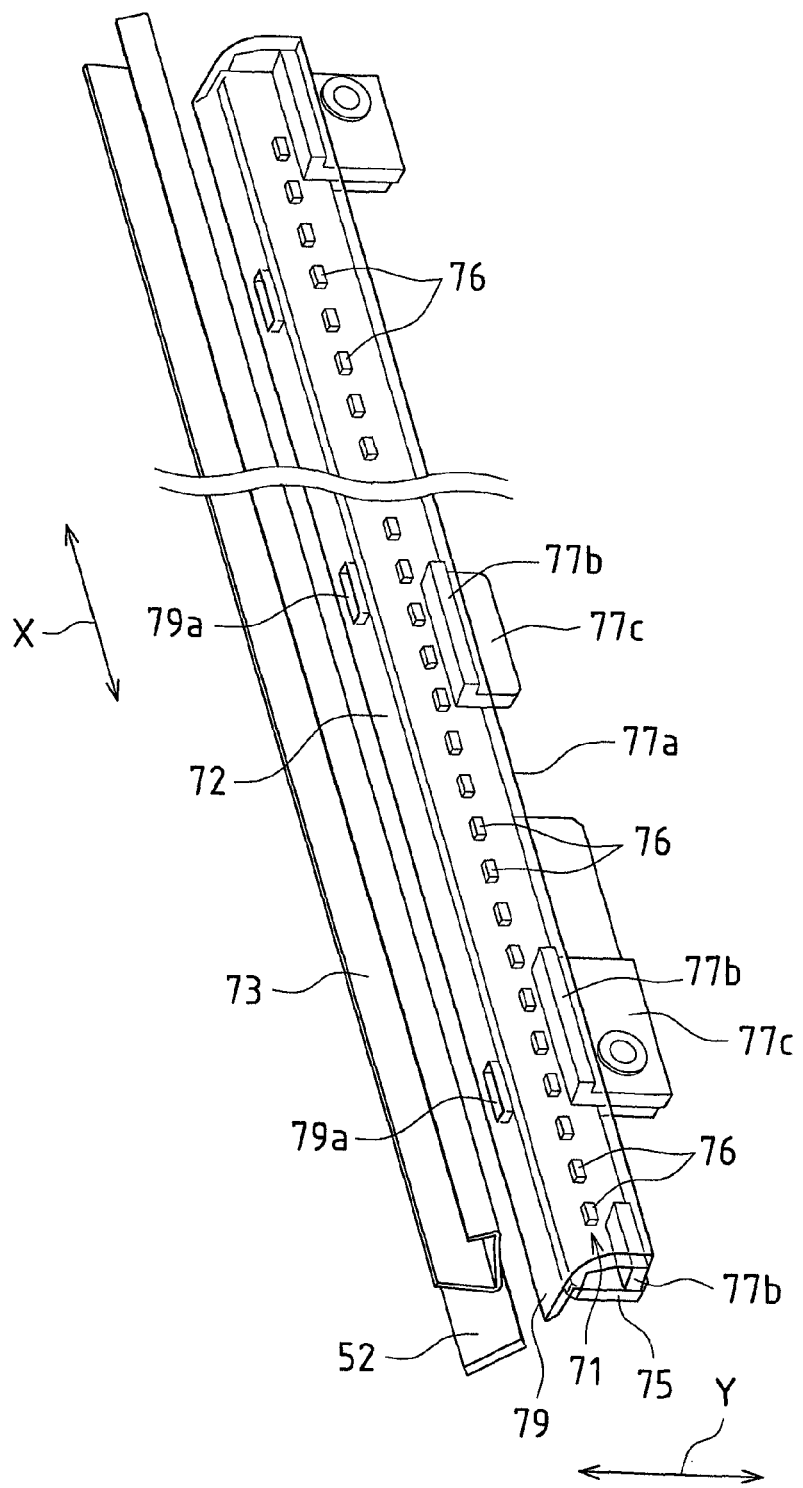
FIG. 4 is a perspective view schematically showing the first scanning unit of FIG. 3.
Figure 5:
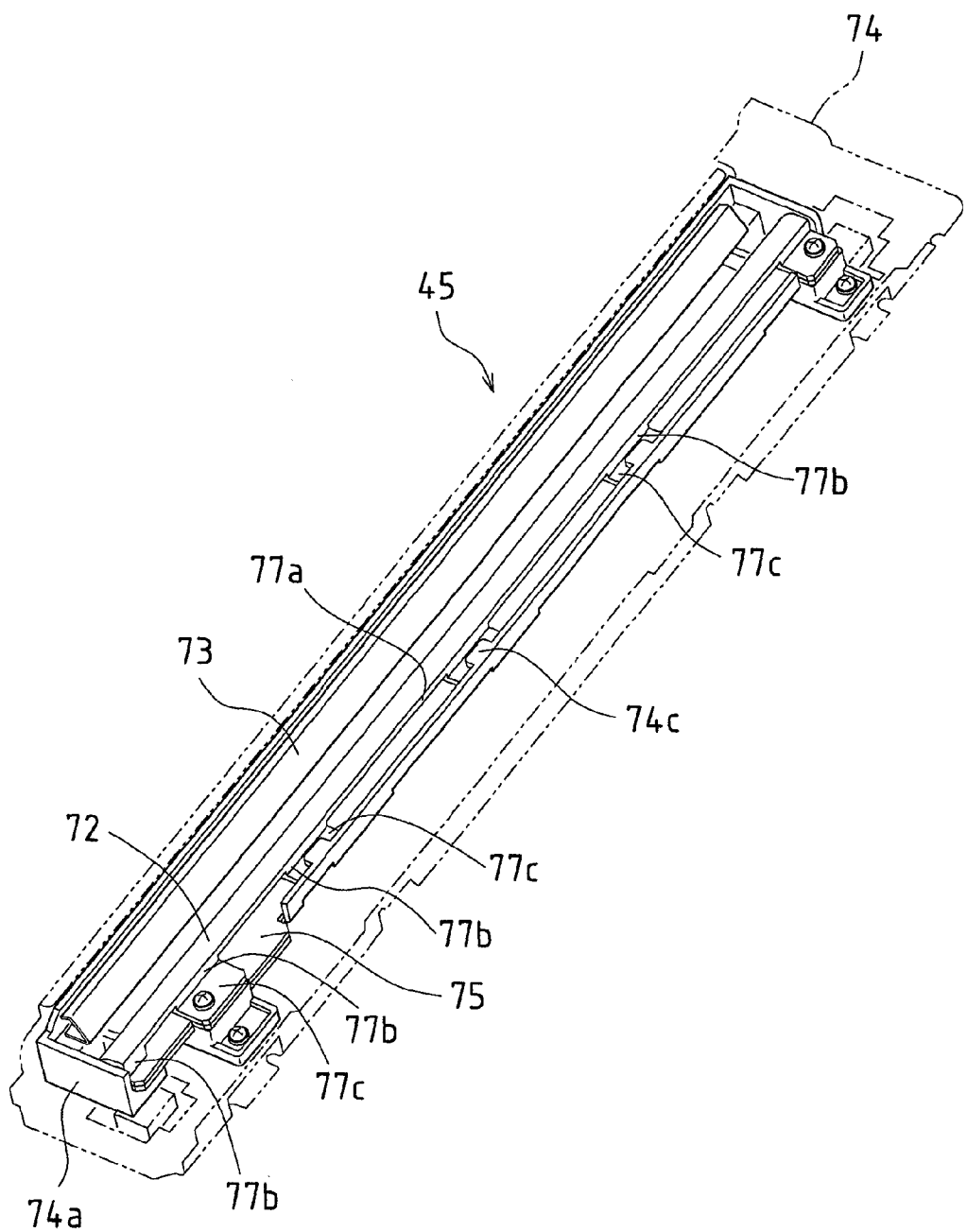
FIG. 5 is a perspective view schematically showing the first scanning unit viewed in the opposite direction to that in FIG. 4.

Next, the configuration of the illuminating device 51 of this embodiment will be described in detail. FIG. 3 is a cross-sectional view schematically showing the first scanning unit 45. FIG. 4 is a perspective view schematically showing the first scanning unit 45. FIG. 5 is a perspective view schematically showing the first scanning unit 45 viewed in the opposite direction to that in FIG. 4.

As clearly seen in FIGS. 3 to 5, the first scanning unit 45 is provided with the illuminating device 51, the first reflecting mirror 52, and a moving frame 74. The illuminating device 51 and the first reflecting mirror 52 are mounted on the moving frame 74, both ends of the moving frame 74 are slidably supported, and the moving frame 74 is moved in the sub-scanning direction Y by the pulley, the wire, and the stepping motor.

The illuminating device 51 is provided with a PWB (printed wiring board) 75 as a base material, the LED array 71 mounted on the PWB 75, the light-guiding member 72 disposed so as to cover the LED array 71, the reflecting plate 73, and a base frame 74a. The base material used in the present invention is not limited to the PWB, but may also include other base materials such as an insulator board. All of the PWB 75, the LED array 71, the light-guiding member 72, the reflecting plate 73, and the base frame 74a are arranged such that their longitudinal direction is in a main-scanning direction X for reading an original. MS, and have a length similar to that of the reading range in the main-scanning direction X.

The base frame 74a is a sub frame disposed so as to be fixed inside the moving frame 74 of the first scanning unit 45, the PWB 75 is placed and fixed on the upper face of the base frame 74a, and the light-guiding member 72 is placed on the PWB 75. Furthermore, the reflecting plate 73 is positioned and fixed inside the moving frame 74 so as to be parallel to the LED array 71 on the PWB 75 and away from the light-guiding member 72. A gap between the light-guiding member 72 and the reflecting plate 73 functions as a slit St in the main-scanning direction X, and the light-guiding member 72 and the LED array 71, and the reflecting plate 73 are distributed and arranged on both sides of the slit St.

The LED array 71 is configured from a plurality of LEDs 76 that are arranged in a line in the main-scanning direction X on the PWB 75. Each LED 76 is connected to a wiring pattern of the PWB 75, the wiring pattern of the PWB 75 is connected via a harness (not shown) to a driver circuit (not shown) mounted on the moving frame 74. This driver circuit supplies electrical power via the harness and the wiring pattern of the PWB 75 to each LED 76, and controls on and off of the LED 76.

The light-guiding member 72 is made of light transmissive synthetic resin (acrylic resin, etc.) or glass, and has the direct emitting portion 77 that is disposed between an illumination range y centered about the original reading position in the sub-scanning direction Y and the LED array 71, the indirect emitting portion 78 that is disposed between the reflecting plate 73 and the LED array 71, and the extending portion 79 that extends from the top face of the PWB 75 (the surface of the PWB 75 on which the LED array 71 is mounted) to a left side end portion 75a of the PWB 75 so as to cover the left side end portion 75a. The direct emitting portion 77, the indirect emitting portion 78, and the extending portion 79 are linked to each other and integrated.

The direct emitting portion 77 and the indirect emitting portion 78 cover the top face of the PWB 75. The direct emitting portion 77 covers a portion obliquely above the PWB 75, that is, a portion on the side of the illumination range y in the sub-scanning direction Y. The direct emitting portion 77 directly guides light emitted from the LED array 71 to the original. Furthermore, the indirect emitting portion 78 covers a portion on the left of the PWB 75, that is, a portion on the side of the reflecting plate 73. The indirect emitting portion 78 is disposed between the PWB 75 and the original. The indirect emitting portion 78 guides light emitted from the LED array 71 to the reflecting plate 73. The extending portion 79 is formed by extending the lower end of the indirect emitting portion 78, and covers the left side end portion 75a of the PWB 75. In this embodiment, the extending portion 79 covers the whole left side surface of the PWB 75.

Leg portions 77b are arranged at a plurality of positions on a right end 77a of the direct emitting portion 77, and these leg portions 77b are placed on the PWB 75. The leg portions 77b respectively include fixing pieces 77c that are overlapped on the right potion of the upper face of the base frame 74a.

Furthermore, fitting holes 79a are formed at a plurality of positions on the extending portion 79, and projecting portions 74b that laterally project are formed on the base frame 74a at positions respectively corresponding to the fitting holes 79a.

Furthermore, a stepped portion 78a is formed at a portion connecting the indirect emitting portion 78 and the extending portion 79, this stepped portion 78a abuts against the left side end portion 75a of the PWB 75, and the inner face of the stepped portion 78a is in close contact with the top face and the side surface of the PWB 75.

Here, the PWB 75 and the light-guiding member 72 are overlapped and placed on the upper face of the base frame 74a, the PWB 75 and the light-guiding member 72 are slid on the upper face of the base frame 74a, and the projecting portions 74b of the base frame 74a are fitted to the fitting holes 79a of the extending portion 79. Furthermore, the leg portions 77b in the right end 77a of the direct emitting portion 77 are placed on the PWB 75, the fixing pieces 77c of the leg portions 77b are overlapped on the right potion of the upper face of the base frame 74a, and the fixing pieces 77c of the leg portions 77b are screw-fastened to the base frame 74a or engaged with engagement portions 74c of the base frame 74a.

Accordingly, the light-guiding member 72 is fixed to the base frame 74a, and the PWB 75 is sandwiched between and fixed to the stepped portion 78a and the leg portions 77b of the light-guiding member 72 and the base frame 74a. As described above, the inner face of the stepped portion 78a is in close contact with the top face and the side surface of the PWB 75.

Accordingly, the base frame 74a supports the light-guiding member 72 and the PWB 75. The base frame 74a has a firm casing structure, and thus prevents the light-guiding member 72 and the PWB 75 from being warped and also prevents the LED array 71 on the PWB 75 from being warped.

The inner faces (the light incident faces facing the LED array 71) of the direct emitting portion 77 and the indirect emitting portion 78 are flat faces. The light incident faces of the direct emitting portion 77 and the indirect emitting portion 78 are arranged at different positions around the LED array 71, and the LED array 71 is disposed on the side of an inner angle defined by these light incident faces. Here, the inner angle is an angle of less than 180° formed by the light incident faces.

Furthermore, the light incident face (rising portion) of the indirect emitting portion 78 rises up from the surface of the PWB 75, and is inclined at an angle $\beta(=100°)$ with respect to the surface of the PWB 75.

Furthermore, the outer faces (the light emission faces facing the illumination range y in the sub-scanning direction Y and the reflecting plate 73) of the direct emitting portion 77 and the indirect emitting portion 78 are convex faces. The outer convex faces of the direct emitting portion 77 and the indirect emitting portion 78 are formed so as to condense light transmitted through the direct emitting portion 77 and light transmitted through the indirect emitting portion 78 and reflected by the reflecting plate 73 onto the illumination range y in the sub-scanning direction Y.

Furthermore, the illumination range y in the sub-scanning direction Y is set directly above the slit St in the main-scanning direction X between the light-guiding member 72 and the reflecting plate 73, and the first reflecting mirror 52 is positioned directly below the slit St.

A light emission face 76a of each LED 76 of the LED array 71 faces the reflecting plate 73, and the optical axis of the LED 76 is in a left direction, that is, a direction toward the reflecting plate 73 and parallel to the surface of the PWB 75. The light emission range of each LED 76 is up to approximately 90° in every direction from the optical axis of the LED 76 centered about this optical axis. Furthermore, the surface of the PWB 75 is set to be white, and light emitted from each LED 76 is reflected by the surface of the PWB 75. Accordingly, almost all parts of light from each LED 76 are emitted in a range α having an angle of 90° defined by the surface of the PWB 75 and a perpendicular plane passing through the LED 76 and perpendicular to the surface of the PWB 75.

Furthermore, the reflecting plate 73 has a first reflecting face 73a and a second reflecting face 73b. The first reflecting face 73a is inclined upward such that light emitted from the LED array 71 and transmitted through the indirect emitting portion 78 or the extending portion 79 can be reflected onto the illumination range y in the sub-scanning direction Y. Furthermore, the first reflecting face 73a includes a lower portion 73c that is disposed at a position lower than the top face of the PWB 75 (i.e., that extends from a plane obtained by extending the top face of the PWB 75 (surface of the PWB 75 on which the LED array 71 is mounted) in a direction away from the original) such that light transmitted through the extending portion 79 can be received and reflected by the lower portion 73c. Furthermore, the second reflecting face 73b is slightly bent with respect to the first reflecting face 73a, and the orientation of the second reflecting face 73b is changed.

Furthermore, the first reflecting mirror 52 is disposed so as to be parallel to the main-scanning direction and inclined at 45° with respect to the scanning face (the surfaces of the platen glass 44 and the original-reading glass 65).

Figure 6:
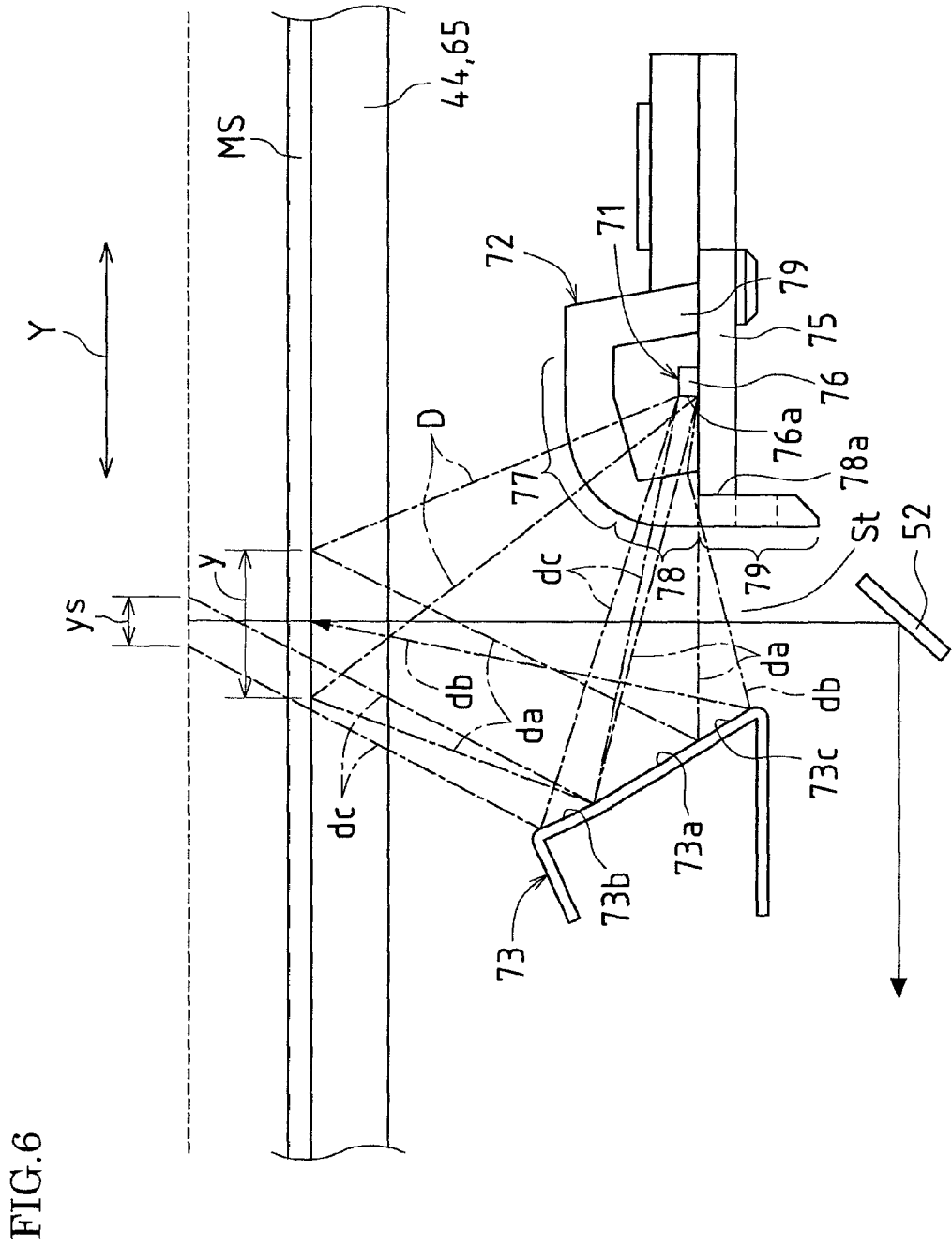
FIG. 6 is a cross-sectional view showing an illuminated state by the illuminating device of the first scanning unit of FIG. 3.

In the thus configured illuminating device 51, as shown in FIG. 6, when the LED array 71 on the PWB 75 emits light, the light emitted from the LED array 71 is incident on the light incident face of the direct emitting portion 77 of the light-guiding member 72, transmitted through the direct emitting portion 77, condensed by the outer convex face of the direct emitting portion 77, and incident on the illumination range y in the sub-scanning direction Y of the surfaces (reference position for reading an original) of the platen glass 44 and the original-reading glass 65.

When an optical path from the LED array 71 via the direct emitting portion 77 to the illumination range y in the sub-scanning direction Y is taken as a direct path D, the direct path D is the shortest straight path from the LED array 71 to the illumination range y, and the light via the direct path D illuminates the illumination range y in the sub-scanning direction Y.

Furthermore, almost all parts of light emitted leftward from the LED array 71 are incident on the light incident face of the indirect emitting portion 78 of the light-guiding member 72, transmitted through the indirect emitting portion 78, condensed by the outer convex face of the indirect emitting portion 78, incident on the first reflecting face 73a of the reflecting plate 73, reflected by the first reflecting face 73a, and incident on the illumination range y in the sub-scanning direction Y.

When an optical path from the LED array 71 via the indirect emitting portion 78 and then the first reflecting face 73a to the illumination range y in the sub-scanning direction Y is taken as a first indirect path da, the first indirect path da is a path bent at the first reflecting face 73a and longer than the direct path D. The light via the first indirect path da also illuminates the illumination range y in the sub-scanning direction Y.

Furthermore, since the light incident face of the indirect emitting portion 78 of the light-guiding member 72 is inclined at the angle $\beta(=100°)$ with respect to the surface of the PWB 75, when light emitted from the LED array 71 in a direction to the left and substantially parallel to the surface of the PWB 75 is incident on the light incident face of the indirect emitting portion 78, the light is refracted in a direction closer to the surface of the PWB 75 (downward), and guided from the indirect emitting portion 78 to the extending portion 79 covering the left side end portion 75a of the PWB 75. Then, the light guided to the extending portion 79 is emitted from the surface of the extending portion 79, incident on the lower portion 73c of the first reflecting face 73a of the reflecting plate 73, reflected by the lower portion 73c of the first reflecting face 73a, and incident on the illumination range y in the sub-scanning direction Y.

In other words, the light incident face of the indirect emitting portion 78 of the light-guiding member 72 is inclined with respect to the surface of the PWB 75 at the angle $\beta$ at which light emitted from the LED array 71 in a direction substantially parallel to the surface of the PWB 75 is incident on and refracted by the light incident face of the indirect emitting portion 78, and guided to the extending portion 79. As a result, light emitted from the surface of the extending portion 79 is incident on and reflected by the lower portion 73c of the first reflecting face 73a of the reflecting plate 73 disposed at a position lower than the surface of the PWB 75.

Alternatively, the angle $\beta$ defined by the light incident face (rising portion) of the indirect emitting portion 78 and the face of the PWB 75 on which the LED array 71 is mounted is an obtuse angle ($90°<\beta<180°$). If the angle $\beta$ is more than $90°$, light emitted from the LED array 71 in a direction substantially parallel to the surface of the PWB 75 is incident on the light incident face of the indirect emitting portion 78, and then refracted downward by the light incident face and guided to the extending portion 79. Furthermore, if the angle $\beta$ is less than $180°$, light emitted from the LED array 71 in a direction substantially parallel to the surface of the PWB 75 can be incident on the light incident face of the indirect emitting portion 78, and then refracted downward by the light incident face and guided to the extending portion 79.

If the angle $\beta$ is $90°$ or less, light emitted from the LED array 71 in a direction substantially parallel to the surface of the PWB 75 is incident on the light incident face of the indirect emitting portion 78, and then is transmitted in a straight line or refracted upward, and, thus, the light is not guided to the extending portion 79. Furthermore, the angle $\beta$ is $180°$ or more, light emitted from the LED array 71 in a direction substantially parallel to the surface of the PWB 75 is not incident on the light incident face of the indirect emitting portion 78.

When an optical path from the LED array 71, via the indirect emitting portion 78, the extending portion 79, and then the first reflecting face 73a, to the illumination range y in the sub-scanning direction Y is taken as a second indirect path db, the second indirect path db is also a path bent at the first reflecting face 73a and longer than the direct path D as in the first indirect path da. The light via the second indirect path db also illuminates the illumination range y in the sub-scanning direction Y.

Since the stepped portion 78a is formed near the second indirect path db, if the amount of scattered light or stray light at the stepped portion 78a increases, the light loss increases. However, as described above, the stepped portion 78a is fitted to the left side end portion 75a of the PWB 75, and the inner face of the stepped portion 78a is in close contact with the top face and the side surface of the PWB 75. Accordingly, generation of scattered light or stray light at the stepped portion 78a is suppressed, and the light loss is reduced.

Furthermore, light emitted from the LED array 71 is transmitted through the indirect emitting portion 78 of the light-guiding member 72, condensed by the outer convex face of the indirect emitting portion 78, incident on the second reflecting face 73b of the reflecting plate 73, reflected by the second reflecting face 73b, and incident on an illumination range ys in the sub-scanning direction Y at a position higher by 5 mm than the surfaces (reference position for reading an original) of the platen glass 44 and the original-reading glass 65.

When an optical path from the LED array 71 via the indirect emitting portion 78 and then the second reflecting face 73b to the illumination range ys in the sub-scanning direction Y is taken as a third indirect path dc, the third indirect path dc is a path bent at the second reflecting face 73b and longer than the direct path D. The light via the third indirect path dc illuminates the illumination range ys in the sub-scanning direction Y at a position higher by 5 mm than the reference position for reading an original. The illumination range ys at a position higher by 5 mm than the reference position for reading an original is set by slightly bending the second reflecting face 73b with respect to the first reflecting face 73a as described above.

Figure 7A:
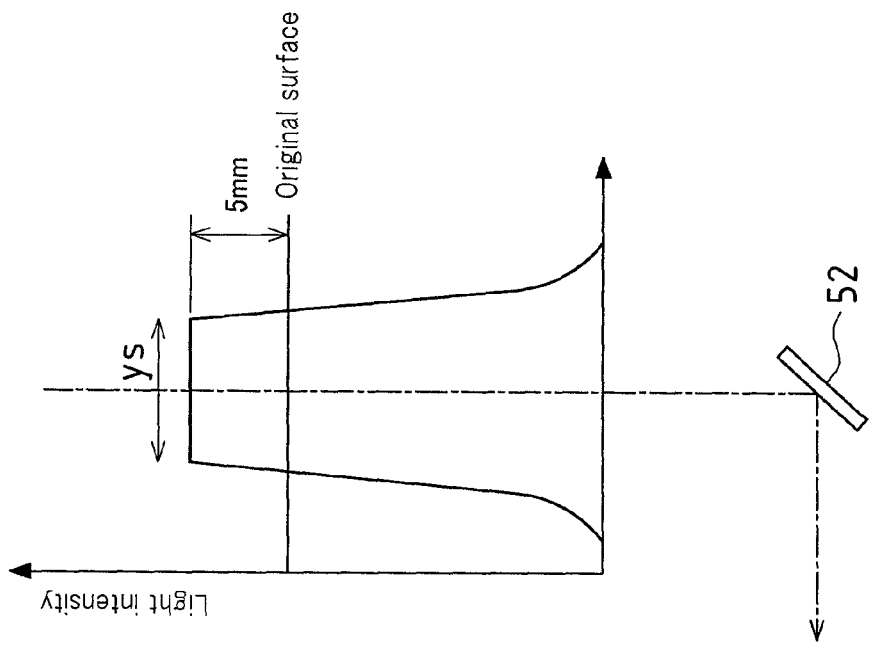
FIG. 7A is a graph showing light intensity in a direct path and a first and a second indirect path.
Figure 7B:
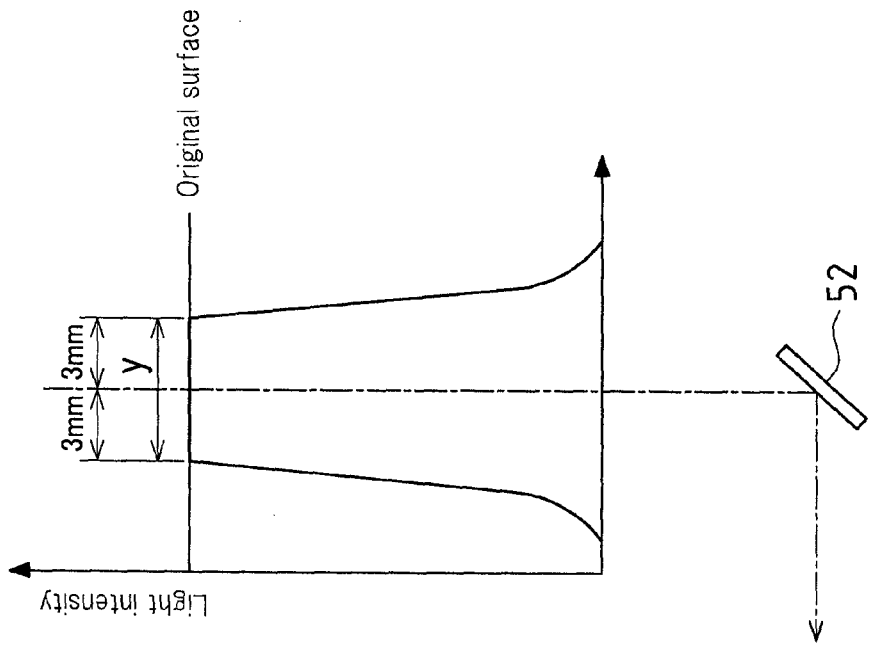
FIG. 7B is a graph showing light intensity in a third indirect path.

FIG. 7A is a graph showing light intensity in the direct path D, the first indirect path da, and the second indirect path db, and FIG. 7B is a graph showing light intensity in the third indirect path dc.

Light in the direct path D, the first indirect path da, and the second indirect path db includes light guided by the direct emitting portion 77, light guided by the indirect emitting portion 78, and light guided by the extending portion 79, and illuminates the illumination range y in the sub-scanning direction Y. The ratio of light guided by the direct emitting portion 77 and the indirect emitting portion 78 is large, and this light is condensed by the convex face of the direct emitting portion 77 and the convex face of the indirect emitting portion 78. Accordingly, as shown in FIG. 7A, the intensity of light in the direct path D, the first indirect path da, and the second indirect path db increases at the position of the surface of the original MS (reference position for reading an original), and is kept substantially uniform across the illumination range y in the sub-scanning direction Y at this surface position. The illumination range y has a width of 3 mm both in the front and rear of the center (reading position) of the range y in the sub-scanning direction Y, that is, a total width of 6 mm.

Accordingly, the illumination range y in the sub-scanning direction Y at the same height as the surface of the original MS is illuminated with light in the straight direct path D transmitted through the direct emitting portion 77, and is illuminated with light in the first indirect path da and the second indirect path db transmitted through the indirect emitting portion 78 and the extending portion 79 and reflected by the first reflecting face 73a of the reflecting plate 73. Accordingly, the surface of the original MS is illuminated with uniform and intense light.

Furthermore, light in the third indirect path dc is condensed by the convex face of the indirect emitting portion 78. Accordingly, as shown in FIG. 7B, the intensity of light in the third indirect path dc increases at a position higher by 5 mm than the surface of the original MS (reference position for reading an original), and is kept substantially uniform across the illumination range ys in the sub-scanning direction Y at the position higher by 5 mm than the surface. The illumination range ys is narrower than the illumination range y.

Figure 8:
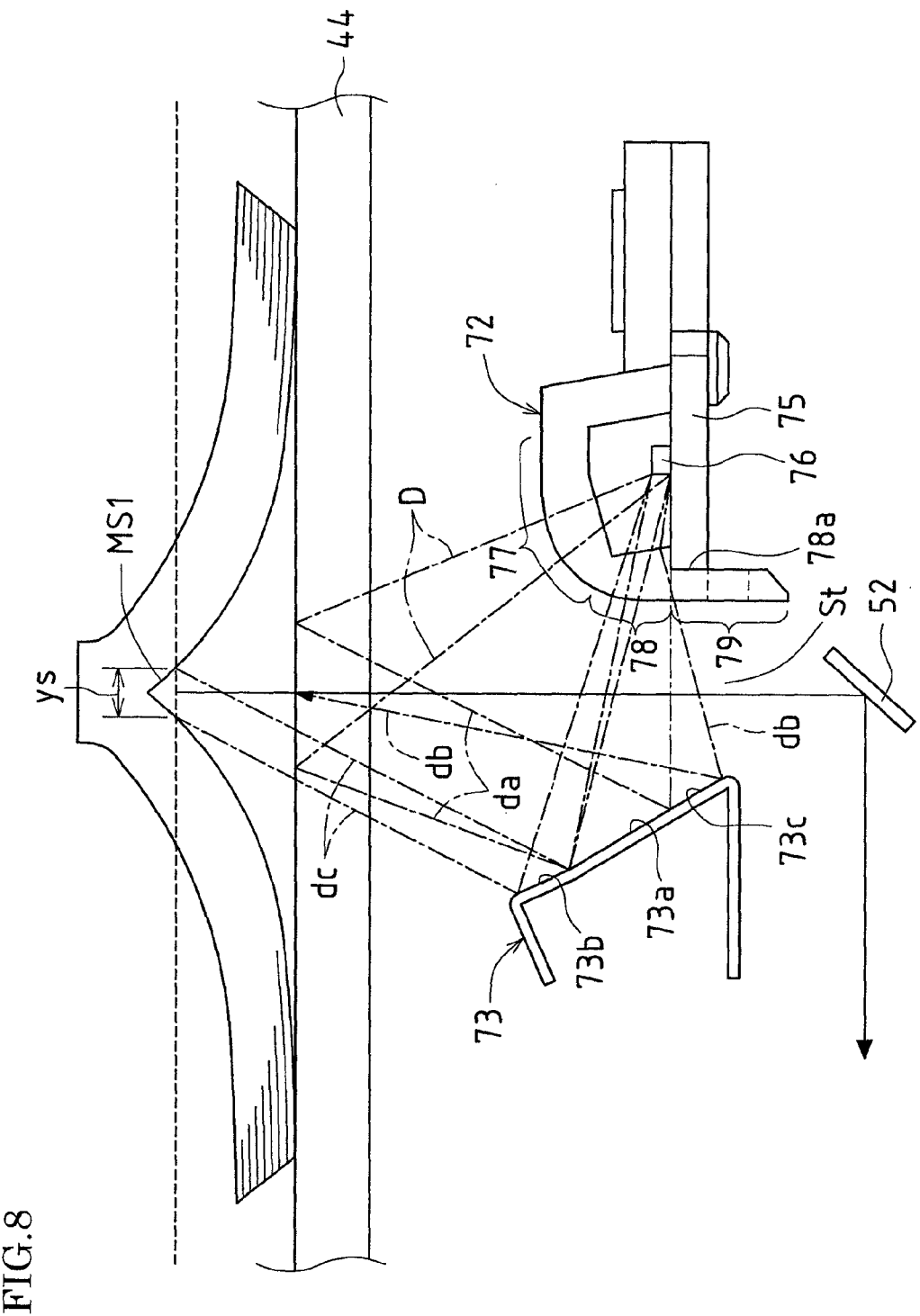
FIG. 8 is a view showing a state in which a book is illuminated.

Accordingly, the illumination range ys in the sub-scanning direction Y at a position higher by 5 mm than the surface of the original MS is illuminated with light in the third indirect path dc transmitted through the indirect emitting portion 78 and reflected by the second reflecting face 73b of the reflecting plate 73. Accordingly, even when the surface of the original MS lifts from the surfaces of the platen glass 44 and the original-reading glass 65, this surfaces are illuminated. For example, as shown in FIG. 8, in a state where a book is opened and placed on the platen glass 44, the pages lifts from the platen glass 44 at a portion MS1 where the book is bound. Here, light in the third indirect path dc reaches the lifted pages, and illuminates the lifted pages.

In this manner, light emitted from the LED array 71 is transmitted via the light-guiding member 72 or the reflecting plate 73 and irradiated on the original MS on the platen glass 44 or the original-reading glass 65. Then, light reflected by the original MS passes through the slit St (optical path; the path of light guided by the reflecting mirrors 52 to 54 and the imaging lens 47 to the CCD 48, in light reflected by the original MS), is reflected by the first reflecting mirror 52, and is emitted via an opening portion of a side wall of the moving frame 74 to the second reflecting mirror 53 of the second scanning unit 46.

Here, light incident on the inner flat face of the direct emitting portion 77 is guided by the direct emitting portion 77 so as to be incident on the illumination range y in the sub-scanning direction Y, and, thus, the amount of light transmitted from the direct emitting portion 77 and incident on the illumination range y in the sub-scanning direction Y increases as the area of the inner flat face of the direct emitting portion 77 increases.

In a similar manner, light incident on the inner flat face of the indirect emitting portion 78 is guided by the indirect emitting portion 78 and the extending portion 79 so as to be incident on the illumination range y in the sub-scanning direction Y, and, thus, the amount of light transmitted from the indirect emitting portion 78 and the extending portion 79 and incident on the illumination range y in the sub-scanning direction Y increases as the area of the inner flat face of the indirect emitting portion 78 increases.

Accordingly, when each of the area of the inner flat face of the direct emitting portion 77 and the area of the inner flat face of the indirect emitting portion 78 is set as appropriate, the ratio between the amount of light transmitted through the direct emitting portion 77 and incident on the illumination range y in the sub-scanning direction Y, and the amount of light transmitted through the indirect emitting portion 78 and the extending portion 79, reflected by the first reflecting face 73a of the reflecting plate 73, and incident on the illumination range y in the sub-scanning direction Y can be adjusted.

Furthermore, light transmitted through the direct emitting portion 77 and incident on the illumination range y is condensed by the direct emitting portion 77, and transmitted via the substantially straight and short direct path D, and, thus, the illumination level by that light is higher, but non-uniformity in the illumination caused by the LEDs 76 being spaced apart from each other in the LED array 71 easily occurs.

Meanwhile, light transmitted via the indirect emitting portion 78, the extending portion 79, and the first reflecting face 73a of the reflecting plate 73 and incident on the illumination range y is condensed by the indirect emitting portion 78, but transmitted via the bent and long first indirect path da and second indirect path db, and, thus, the light is dispersed more than the light transmitted through the direct emitting portion 77, and the non-uniformity in the illumination is reduced although the illumination level by that light is lower.

Accordingly, when each of the area of the inner flat face of the direct emitting portion 77 and the area of the inner flat face of the indirect emitting portion 78 is set as appropriate, the ratio between the amount of light transmitted through the direct emitting portion 77 and incident on the illumination range y, and the amount of light incident on the illumination range y via the indirect emitting portion 78, the extending portion 79, and the first reflecting face 73a of the reflecting plate 73 can be adjusted, and the illumination level and the non-uniformity in the illumination can be adjusted.

More specifically, since a light emission face 71a of the LED array 71 faces the reflecting plate 73, the amount of light transmitted from the LED array 71 is large in the orientation toward the reflecting plate 73, but, when the area of the inner flat face of the indirect emitting portion 78 is set to be smaller than the area of the inner flat face of the direct emitting portion 77, the ratio between the amount of light incident on the illumination range y via the indirect emitting portion 78, the extending portion 79, and the first reflecting face 73a of the reflecting plate 73 (the amount of light incident on the illumination range y via the reflecting plate 73 from the light-guiding member 72), and the amount of light incident on the illumination range y via the direct emitting portion 77 (the amount of light incident on the illumination range y directly from the light-guiding member 72) is set to, for example, 4:6 to 5:5, the illumination level and the non-uniformity in the illumination can be adjusted as appropriate.

Figure 9:
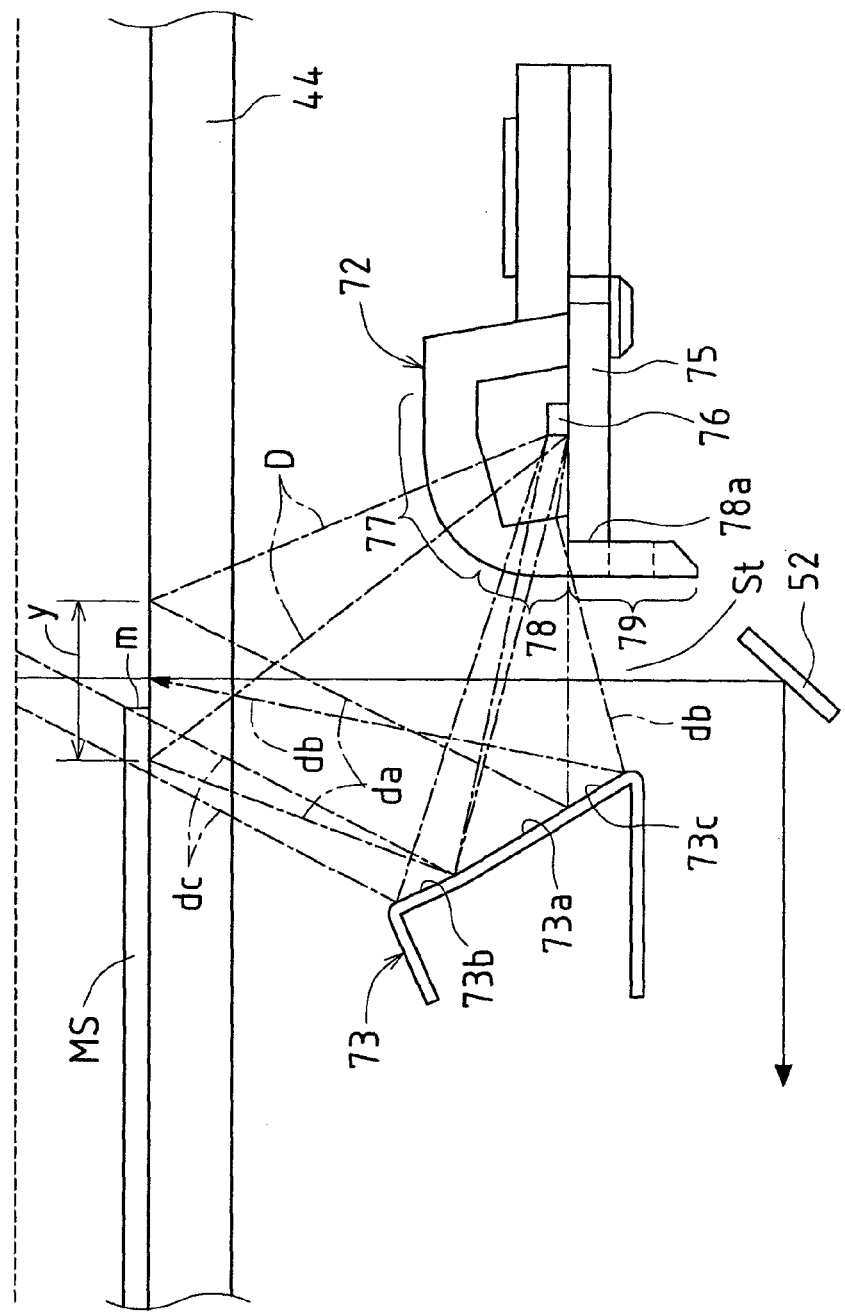
FIG. 9 is a view showing a state in which a trailing edge portion of an original is illuminated.

Furthermore, the direction in which light transmitted through the direct emitting portion 77 is incident on the illumination range y is different from the direction in which light reflected by the reflecting plate 73 is incident on the illumination range y. Accordingly, for example, as shown in FIG. 9, even in a state where a trailing edge portion m of the original MS is positioned in the illumination range y, and light reflected by the first reflecting face 73a of the reflecting plate 73 is incident on the trailing edge portion m of the original MS to form the shadow of the trailing edge portion m, the shadow disappears due to light transmitted through the direct emitting portion 77 being incident thereon. That is to say, the trailing edge portion m of the original MS is irradiated with light from front and light from rear, and, thus, the shadow of the trailing edge portion m of the original MS is not formed, and no shadow is formed on an image of an original read by the CCD 48. Thus, it is preferable to set the ratio between the amount of light emitted via the indirect emitting portion 78 and the first reflecting face 73a of the reflecting plate 73 to the illumination range y and the amount of light emitted via the direct emitting portion 77 to the illumination range y to approximately 4:6.

Furthermore, the inner flat face of the direct emitting portion 77 and the inner flat face of the indirect emitting portion 78 face each LED 76 of the LED array 71 from mutually different directions. Accordingly, even when the light-guiding member 72 is displaced, a situation hardly occurs in which the amount of light transmitted from the LED array 71 and incident on the direct emitting portion 77 and the amount of light transmitted from the LED array 71 and incident on the indirect emitting portion 78 are simultaneously and significantly reduced, and, thus, the light loss can be suppressed low.

Furthermore, as shown in FIGS. 3 and 4, the direct emitting portion 77 covers a portion obliquely above the LED array 71, and the indirect emitting portion 78 covers a portion on the left of the LED array 71. Accordingly, almost all parts of light emitted from the LED array 71 in the range a having an angle of 90° are transmitted through the direct emitting portion 77, the indirect emitting portion 78, and the extending portion 79 and incident on the illumination range y, and, thus, the light loss can be suppressed low.

Furthermore, the surface of the PWB 75 is set to be a white face. Accordingly, light reflected by the surface of the PWB 75 is also transmitted through the direct emitting portion 77 and the indirect emitting portion 78 and incident on the illumination range y, and, thus, the light loss can be suppressed lower. Here, in this specification, "white face" refers to a face having an ISO whiteness (JIS P8148) of 70% or more in diffuse illumination.

Furthermore, the PWB 75 is sandwiched between and firmly supported by the light-guiding member 72 and the base frame 74a. Accordingly, precise positioning of the LED array 71 on the PWB 75 with respect to the direct emitting portion 77, the indirect emitting portion 78, and the extending portion 79 becomes possible. Furthermore, displacement hardly occurs, and the light loss caused by displacement can be prevented.

Figure 10:
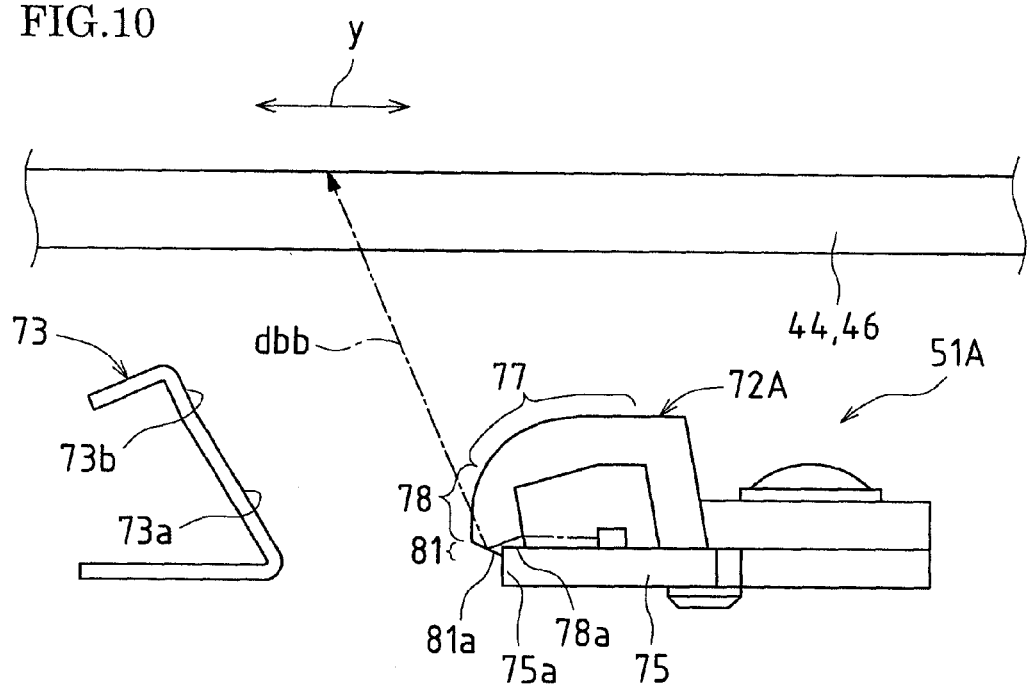
FIG. 10 is a cross-sectional view schematically showing a first scanning unit of an image-reading apparatus to which an illuminating device according to a second embodiment of the present invention has been applied.

FIG. 10 is a cross-sectional view schematically showing a first scanning unit of an image-reading apparatus to which an illuminating device according to a second embodiment of the present invention has been applied. Note that the constituent elements in FIG. 10 having the same effects as those in FIG. 3 are denoted by the same reference numerals.

As in the illuminating device 51 of FIG. 3, an illuminating device 51A of this embodiment is mounted on the first scanning unit 45 in the image-reading apparatus 41 of FIG. 2, and this image-reading apparatus 41 is applied to the image-forming apparatus 100 of FIG. 1.

In the illuminating device 51A, a light-guiding member 72A is applied instead of the light-guiding member 72 of FIG. 3. The light-guiding member 72A has the direct emitting portion 77 and the indirect emitting portion 78 as in the light-guiding member 72 of FIG. 3, but is different from the light-guiding member 72 of FIG. 3 in having an extending portion 81 instead of the extending portion 79 of the light-guiding member 72.

The extending portion 81 of the light-guiding member 72A extends from the top face of the PWB 75 (the surface of the PWB 75 on which the LED array 71 is mounted) to the left side end portion 75a of the PWB 75 so as to cover the left side end portion 75a (so as to cover the upper end portion of the left side surface of the PWB 75). The extending portion 81 has a cut face 81a formed by obliquely cutting the lower end of the extending portion 81. Light guided from the LED array 71 via the indirect emitting portion 78 to the extending portion 81 is totally reflected by the cut face 81a, and emitted to the illumination range y in the sub-scanning direction Y.

Figure 11:
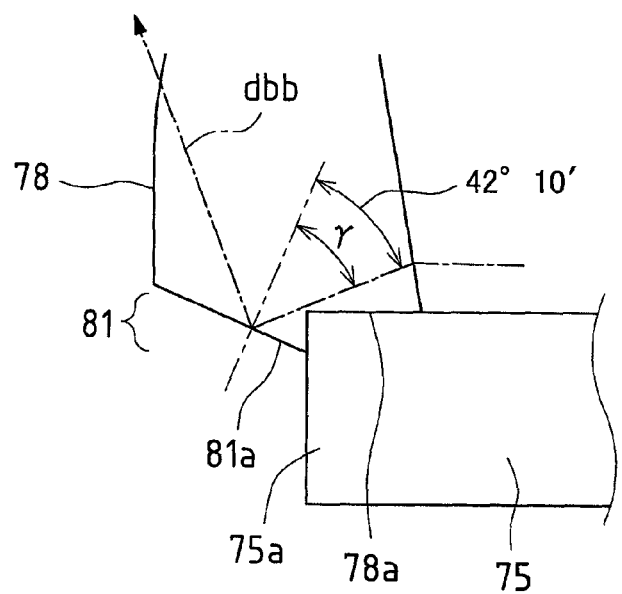
FIG. 11 is an enlarged view showing part of FIG. 10.

In order to realize the total internal reflection at the cut face 81a, as shown in FIG. 11, the orientation of the cut face 81a is set such that a minimum incident angle γ of light on the cut face 81a is a critical angle or more. For example, when the light-guiding member 72A is made of transparent acrylic resin, the critical angle is 42° 10'. Furthermore, the minimum incident angle γ of light transmitted from the LED array 71 via the indirect emitting portion 78 and incident on the cut face 81a of the extending portion 81 is an incident angle of light refracted by the light incident face of the indirect emitting portion 78 and passed through a position near the corner of the left side end portion 75a of the PWB 75. Accordingly, the orientation of the cut face 81a at which the minimum incident angle γ of light on the cut face 81a is the critical angle or more can be obtained in advance by drawing figures or the like and set.

With such a configuration having the extending portion 81, light emitted from the LED array 71 in a direction to the left and substantially parallel to the surface of the PWB 75 is refracted by the light incident face of the indirect emitting portion 78 of the light-guiding member 72 in a direction closer to the surface of the PWB 75 (downward), and guided from the indirect emitting portion 78 to the extending portion 81 covering the left side end portion 75a of the PWB 75. Then, the light is reflected by the cut face 81a of the extending portion 81 and incident on the illumination range y in the sub-scanning direction Y. When an optical path from the LED array 71 via the indirect emitting portion 78 and then the cut face 81a of the extending portion 81 to the illumination range y in the sub-scanning direction Y is taken as a second indirect path dbb.

Furthermore, as in the illuminating device 51 of FIG. 3, illumination is performed via the direct path D from the LED array 71 via the direct emitting portion 77 to the illumination range y in the sub-scanning direction Y, the first indirect path da from the LED array 71 via the indirect emitting portion 78 and then the first reflecting face 73a to the illumination range y in the sub-scanning direction Y, and the third indirect path dc from the LED array 71 via the indirect emitting portion 78 and then the second reflecting face 73b to the illumination range ys in the sub-scanning direction Y.

Accordingly, as in the illuminating device 51 of FIG. 3, the illuminating device 51A of this embodiment also can illuminate the illumination range y at the reference position for reading an original with light in the direct path D, the first indirect path da, and the second indirect path dbb, and can illuminate the illumination range ys at a position higher by 5 mm than the reference position for reading an original with light in the third indirect path dc.

Furthermore, since the second indirect path dbb also guides light emitted from the LED array 71 in a direction substantially parallel to the surface of the PWB 75, if the amount of scattered light or stray light at the stepped portion 78a increases, the light loss increases. However, the inner face of the stepped portion 78a is in close contact with the top face and the side surface of the PWB 75. Accordingly, generation of scattered light or stray light at the stepped portion 78a can be suppressed, and the light loss can be reduced.

As described above, in the foregoing embodiments, the light-guiding member 72 or 72A includes the extending portion 79 or 81 that extends from the top face of the PWB 75 (the surface of the PWB 75 on which the LED array 71 is mounted) to the left side end portion 75a of the PWB 75 so as to cover the left side end portion 75a. Accordingly, light emitted from the LED array 71 in a direction substantially parallel to the surface of the PWB 75 can be guided and controlled by the extending portion 79 or 81, and the loss in light emitted from the LED array 71 can be reduced.

For example, it is possible to illuminate the original, by setting light guided by the extending portion 79 of the light-guiding member 72 to be reflected by the first reflecting face 73a of the reflecting plate 73, or by setting light guided by the extending portion 81 to be reflected by the cut face 81a of the extending portion 81.

Furthermore, the light incident face of the indirect emitting portion 78 of the light-guiding member 72 is inclined at the obtuse angle β with respect to the surface of the PWB 75. Thus, light emitted from the LED array 71 in a direction to the left and substantially parallel to the surface of the PWB 75 is refracted by the light incident face of the indirect emitting portion 78 in a direction closer to the surface of the PWB 75, and guided to the extending portion 79. Accordingly, the effect of the extending portion 79 is clearly exhibited.

Here, even when the light incident face of the indirect emitting portion 78 is at 90° or less with respect to the surface of the PWB 75, if part of light emitted from the LED array 71 in a direction to the left and substantially parallel to the surface of the PWB 75 is refracted by the light incident face of the indirect emitting portion 78 and guided to the extending portion 79 or 81, the part of light can be guided and controlled by the extending portion 79 or 81, and the light loss can be reduced.

Furthermore, the inner face of the stepped portion 78a of the light-guiding member 72 or 72A is in close contact with the top face and the side surface of the PWB 75. Accordingly, generation of scattered light or stray light at the stepped portion 78a is suppressed, and the light loss is reduced.

Furthermore, the light-guiding member 72 or 72A is fixed to the base frame 74a, and the PWB 75 is sandwiched between and fixed to the light-guiding member 72 or 72A and the base frame 74a. Accordingly, the base frame 74a reinforces the light-guiding member 72 or 72A and the PWB 75, and the light-guiding member 72 or 72A, the PWB 75, and the LED array 71 on the PWB 75 are not warped.

Above, preferred embodiments and modified examples of the present invention were described with reference to the attached drawings, but of course the invention is not limited by that example. The invention may be embodied in various other forms without departing from the spirit or essential characteristics thereof. Thus, the scope of the invention is indicated by the appended claims rather than by the foregoing description. It will be clear to those skilled in the art that within the category described in the claims, various modified or revised examples can be arrived at, and it will be understood by those skilled in the art that such examples also are naturally encompassed by the technical scope of the invention. Also, all modifications or changes that come within the range of equivalency of the claims are intended to be embraced therein.

What is claimed is:

1. An illuminating device comprising a light-emitting element mounted on a base material, and a light-guiding member for guiding light from the light-emitting element to an irradiation target, the irradiation target being illuminated with the light transmitted through the light-guiding member, wherein the light-guiding member has an extending portion that extends from a surface of the base material on which the light-emitting element is mounted to a side end portion of the base material so as to cover the side end portion of the base material, and further comprising a reflecting member that reflects light emitted from the light-emitting element and transmitted through the light-guiding member, thereby illuminating the irradiation target, wherein the light-emitting element and the reflecting member are arranged so as to sandwich a path through which light reflected by the irradiation target passes, and the light-guiding member is disposed on a light-emitting element side, and light guided through the extending portion of the light-guiding member and emitted from the extending portion is reflected by the reflecting member and illuminates the irradiation target.

2. The illuminating device according to claim 1, wherein the light-guiding member further comprises:

a direct emitting portion that is disposed between the light-emitting element and the irradiation target, and that directly guides light emitted from the light-emitting element to the irradiation target; and an indirect emitting portion that is disposed between the light-emitting element and the reflecting member and between the base material and the irradiation target, and that guides light emitted from the light-emitting element to the reflecting member; and a light emission face of the indirect emitting portion facing the reflecting member is a convex face.

3. The illuminating device according to claim 1, wherein a direction of an optical axis of the light-emitting element is a direction toward the reflecting member.

4. The illuminating device according to claim 1, wherein a ratio between an amount of light incident on the irradiation target via the reflecting member from the light-guiding member and an amount of light incident on the irradiation target directly from the light-guiding member is set to 4:6 to 5:5.

5. The illuminating device according to claim 1, wherein the extending portion is arranged so as to cover a whole side surface of the base material, and a portion of the reflecting member extends from a plane obtained by extending the surface of the base material on which the light-emitting element is mounted in a direction away from the irradiation target.

6. The illuminating device according to claim 1, wherein the light-guiding member is in close contact with the surface of the base material on which the light-emitting element is mounted and the side end portion of the base material.

7. The illuminating device according to claim 1, further comprising a frame that integrally supports the base material and the light-guiding member, wherein the light-guiding member is fixed to the frame.

8. The illuminating device according to claim 1, wherein the surface of the base material on which the light-emitting element is mounted is a white face.

9. An image-reading apparatus comprising the illuminating device according to claim 1.

10. An image-forming apparatus comprising the image-reading apparatus according to claim 9.

11. An illuminating device comprising a light-emitting element mounted on a base material, and a light-guiding member for guiding light from the light-emitting element to an irradiation target, the irradiation target being illuminated with the light transmitted through the light-guiding member,
wherein the light-guiding member has an extending portion that extends from a surface of the base material on which the light-emitting element is mounted to a side end portion of the base material so as to cover the side end portion of the base material, and
further comprising a cut face that is formed by cutting the extending portion of the light-guiding member, and that reflects light guided to the extending portion.

12. The illuminating device according to claim 11, wherein the cut face is formed such that light guided to the extending portion is totally reflected by the cut face and emitted to the irradiation target.

13. An image-reading apparatus comprising the illuminating device according to claim 11.

14. An image-forming apparatus comprising the image-reading apparatus according to claim 13.

15. An illuminating device comprising a light-emitting element mounted on a base material, and a light-guiding member for guiding light from the light-emitting element to an irradiation target, the irradiation target being illuminated with the light transmitted through the light-guiding member,
wherein the light-guiding member has an extending portion that extends from a surface of the base material on which the light-emitting element is mounted to a side end portion of the base material so as to cover the side end portion of the base material,
the light-guiding member has a light incident face on which light from the light-emitting element is incident,
the light incident face includes a rising portion that rises up from the surface of the base material on which the light-emitting element is mounted, and
the rising portion of the light incident face is inclined with respect to the surface of the base material on which the light-emitting element is mounted at an angle at which light emitted from the light-emitting element in a direction parallel to the surface of the base material on which the light-emitting element is mounted is incident on and refracted by the rising portion, and guided to the extending portion.

16. The illuminating device according to claim 15, wherein the angle defined by the rising portion of the light incident face and the surface of the base material on which the light-emitting element is mounted is an obtuse angle.

17. The illuminating device according to claim 15, wherein the light-guiding member is in close contact with the surface of the base material on which the light-emitting element is mounted and the side end portion of the base material.

18. The illuminating device according to claim 15, wherein the surface of the base material on which the light-emitting element is mounted is a white face.

19. An image-reading apparatus comprising the illuminating device according to claim 15.

20. An image-forming apparatus comprising the image-reading apparatus according to claim 19.

* * * * *